Jan. 24, 1928.
T. H. SYMINGTON
1,657,327
COMBINED SIDE BEARING AND LATERAL MOTION DEVICE
Filed March 22, 1927
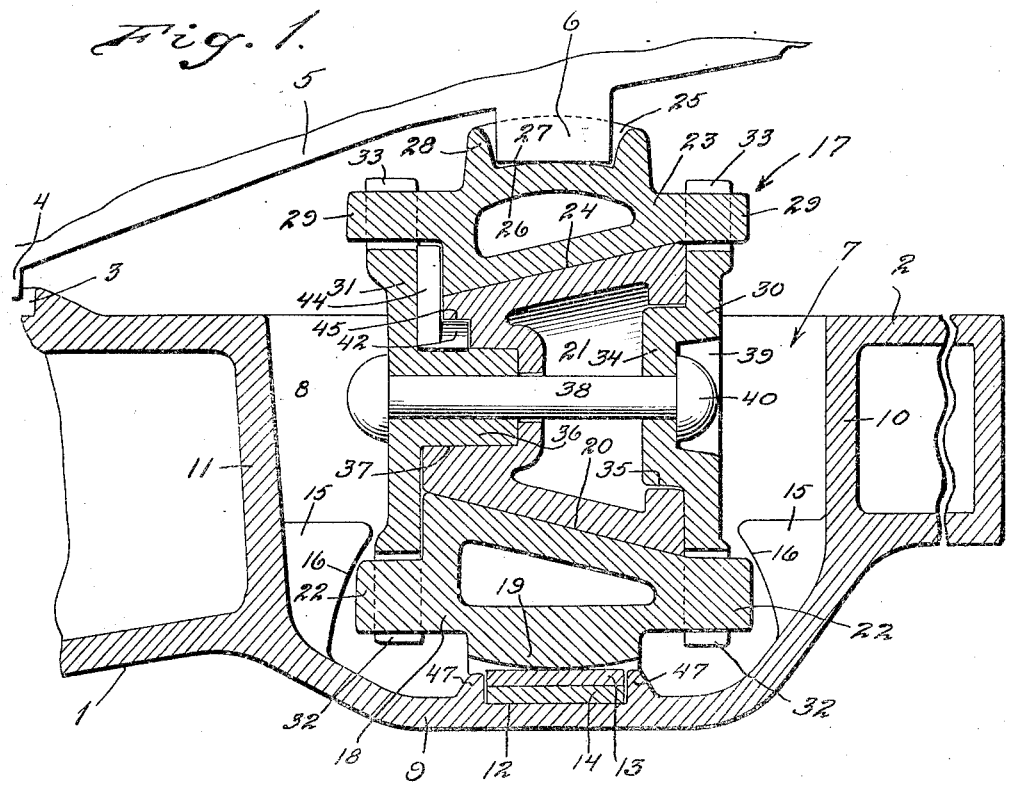
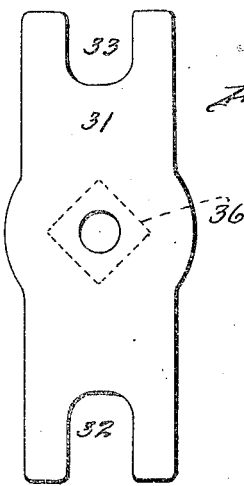
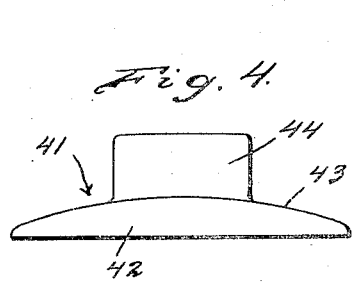
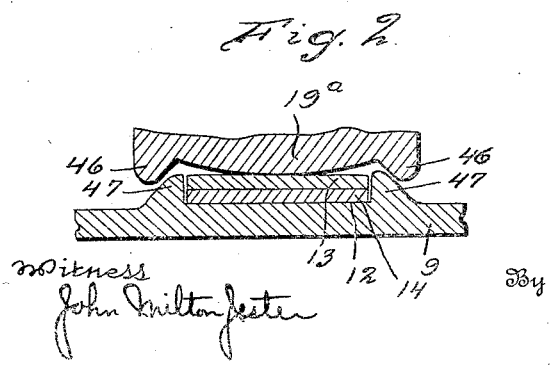

Patented Jan. 24, 1928.

1,657,327

UNITED STATES PATENT OFFICE.

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND.

COMBINED SIDE-BEARING AND LATERAL-MOTION DEVICE.

Application filed March 22, 1927. Serial No. 177,286.

The invention relates to railway truck bolsters, particularly to side bearing structures therefor.

The principal object of the invention, generally stated, is to provide a truck bolster designed particularly for use under those circumstances wherein the body bolster is sustained upon side bearings, the center plate and center bearing having clearance permitting relative longitudinal movement of the truck and body bolsters, ordinarily called lateral motion, as well as the usual swiveling action.

An important object of the invention is the provision of a truck bolster having embodied therein a side bearing structure permitting the necessary swiveling action of the truck and body bolsters and at the same time so mounted as to permit rocking during lateral motion of truck bolster.

Another object of the invention is to provide a truck bolster with a single unitary structure at each end fulfilling the purposes both of side bearings and lateral motion devices.

Another object of the invention is to provide a truck bolster of such construction that it may be so mounted within the side frames of a truck as to be incapable of any movement other than vertical as the truck springs are compressed or relieved during car travel, the truck bolster having embodied therein a side bearing structure movable in two directions, one for permitting relative swiveling of the truck and body bolsters and the other for permitting longitudinal movement of the body bolster with respect to the truck bolster, or lateral motion, this latter mentioned feature being of great advantage, especially when a train is rounding a curve.

A further object of the invention is to provide a truck bolster and combined side bearing and lateral motion device permitting free movement of the body bolster with respect to the truck bolster, the parts being consequently able to accommodate themselves to whatever conditions or circumstances may arise without any possible binding.

Still another object of the invention is to provide a side bearing structure for a truck bolster located within a pocket in the bolster so as not to project beyond the top thereof to an excessive extent, the side bearing structure having its uppermost and lowermost bearing surfaces of peculiar formation to insure free movement in substantially any direction to meet the demands of the occasion or changes in the conditions which occur during car travel.

Yet another object of the invention is to provide a side bearing structure having means for taking up wear which may occur as the result of service, this take-up feature being of importance as eliminating or at least rendering it possible to eliminate any undue looseness or lack of cooperation of co-acting surfaces.

Another object of the invention is to provide a combined side bearing and lateral motion device which may be assembled as a complete unit ready for future installation within a suitably constructed bolster, the parts being, moreover, of such form and being arranged in such relation that disassociation in use will be impossible.

The invention further contemplates the provision of various other details in regard to structure which will render the assembly simple and inexpensive to make, easy to install, positive in action, efficient and durable in service, and a general improvement in the art.

To the attainment of the foregoing and other objects and advantages, the invention preferably consists in the construction, combination and arrangement of parts to be hereinafter more fully described and claimed, and illustrated in the accompanying drawings in which:

Figure 1 is a vertical longitudinal section through one end portion of a bolster showing my bearing structure in combination therewith and in operative relation to the body bolster.

Figure 2 is a detail section showing a modified construction of the bottom.

Figure 3 is a detail end elevation of one of the rockable members at an end of the roller.

Figure 4 is a detail elevation of the bearing member at the same end of the roller.

Referring more particularly to the drawings, the numeral 1 designates generally the bolster which may be of more or less conventional design in some respects so as to be capable of replacing one of standard pattern and without necessitating any modifications in the construction of the side frames or other truck parts. This bolster has its ends formed with extensions 2 adapted to operate within the window openings of the truck side frames and it is provided centrally with a center bearing 3 for the reception of the center plate 4 carried by the body bolster 5, the intention being to provide clearance between the center plate and center bearing so as to permit not only relative swiveling motion of the body and truck bolsters but also relative longitudinal movement, or in other words, lateral motion. The body bolster 5 has depending therefrom any ordinary or preferred bearing element 6 adapted to cooperate with the side bearing structure to be described. It will be observed that the body bolster, center plate and bearing member 6 are rather diametrically shown as they form no real part of the present invention.

In carrying out the invention the truck bolster 1 is formed near each end with a pocket 7 which is defined between the sides 8 of the bolster, a downwardly offset bottom wall 9 and end walls 10 and 11. The depth of this pocket, as well as its other dimensions, may of course, be varied, depending upon the contemplated size of the side bearing structure to be installed therein, this in turn being governed greatly by the character of the car to be equipped with the invention and the loads it is proposed to handle. The bottom wall 9 of the pocket is shown as formed at substantially its center with a socket or recess 12 within which is mounted a bearing plate 13, it being preferable that a shim or shims 14 be interposed beneath this bearing plate so that the height thereof may be varied for adjusting purposes. The confronting faces of the walls 10 and 11 are here shown as formed with inwardly extending guide webs 15 having their confronting faces 16 curved and preferably concentric with the center point of the bearing plate 13, all for a purpose to be explained hereinafter.

The side bearing structure as a unit is designated by the numeral 17 and preferably comprises a bottom bearing member 18 located within the lower portion of the pocket between the webs 15 and provided at its undersurface with a partially cylindrical bearing portion 19 having a radius in excess of that of a cylinder whose diameter is equal to the distance between bearing surfaces 13 and 27, this portion 19 being engaged upon the bearing plate 13 and adapted to rock thereon. The top surface of the member 18 is preferably inclined, as shown at 20, to form a seat for a preferably frusto-conical or tapered roller 21, and at its opposite ends the member 18 is formed with reduced extensions 22 of any desired specific configuration.

Engaged in turn upon the roller 21 is an upper bearing member 23 having an inclined lower surface 24 of the same pitch as the roller. This member 23 is formed at its top with a socket or recess 25 for the reception of the bearing element 6 which depends from the body bolster and the surface or wall 26 of this recess is convex and formed preferably as a section of a cylinder whose radius may be the same or vary with the construction of the contour 19 so as to have rocking engagement with the flat bottom surface 27 of the bearing element 6. The upstanding wall portions 28 which define the recess 25 will, of course, act to prevent disengagement of the bearing element 6 from within the recess though it will be noted that these walls are curved or flared upwardly and outwardly to avoid interference with the element 6 during any rocking movement that may occur. The member 23 is provided at its sides with reduced extensions 29 located normally in vertical spaced relation to the extensions 22 of the bottom bearing member 18.

Located at the ends of the roller are rocker arms 30 and 31 which possess many characteristics in common in that each is provided at its ends with notches 32 and 33 for engagement upon the reduced extensions 22 and 29 of the bottom and top bearing members 18 and 23, respectively. However, the rocker arm 30 has a cylindrical hub portion 34 substantially fitting within a similar opening 35 in the larger or outer end of the roller, whereas the rocker 31 has a hub portion 36 which is angular in cross section and received within a correspondingly shaped recess 37 in the inner or smaller end of the roller. Both rockers and the roller are held in assembled relation by suitable securing elements such as the rivet 38 which passes axially through the roller and through the hub portions 34 and 36 of the rockers, the hub portion 34 being preferably recessed at its outer face, as illustrated at 39 to accommodate either the head or upset end 40 of the rivet so as to avoid having it project.

For taking up wear, I preferably make use of a bearing member 41, shown in detail in Figure 4, which member includes a foot portion 42 having a convex upper surface 43 from which rises a plate portion 44. This bearing member is located between the rocker 31 and the roller 21, the foot portion 42 fitting within a similar recess 45 in the smaller end of the roller, and the plate portion 44 being confined between the rocker and the adjacent wall portion of the upper bearing member 23.

As mentioned above, it is intended that the entire side bearing assembly 17 be capable of rocking movement and it is of course necessary to provide means for preventing actual displacement of the assembly, for which reason the ends of member 22 are confined longitudinally by the walls 8 of the bolster 1.

In Figure 2 which discloses an alternate method for preventing displacement of the bottom bearing on the longitudinal axis of the bolster, projections 46 at the sides of cylindrical surfaces 19 coact with projections or guides 47 extending from the floor 9 of the bolster. The contour of these cooperating projections is such that free rocking of the assembly 17 in the direction of the longitudinal axis of the bolster is permitted without disengagement of projections 46 and 47.

In the operation of the device it will be seen that the load is of course sustained by the side bearing assembly at each end of the bolster. It will be noted that only one side bearing structure is shown as it would be duplicated at the other end of the bolster. Whenever there is any tendency toward relative swiveling movement of the body and truck bolsters, the bearing element 6 depending from the body bolsters and engaging within the recess 25 will cause the bearing member 23 to move laterally of the truck bolster and as the reduced extensions 29 are engaged within the notches 33 at the upper ends of the rockers 30 and 31, the roller or rocker 21 will be caused to rotate through the medium of projections 34 and 36 of the rockers 30 and 31. In view of the fact that the rocker 31 is provided with the angular extension 36 fitting within the angular socket 37 in the roller, the roller will be maintained in a constant position as regards the rocker, or in other words centered between the surfaces 20 and 24 of the lower and upper bearing members. Whenever there is any tendency for the development of lateral motion as is bound to occur frequently during car service, the entire side bearing assembly 17 will rock upon the bearing plate 13, the roller being inactive at such a time. Ordinarily, the lateral motion and the swiveling motion will probably occur at the same time but this combination is well taken care of owing to universal movement of which the side frame is capable. Owing to the fact that the surfaces 16 of the guide webs 15 are curved to conform to the path of movement of the extensions 22 under the conditions, there will be no interference with the action.

As stated above the radius of the surfaces 19 and 26 is greater than one-half the distance between the surfaces 27 and 13. This being the case, the centers of these radii do not coincide but are eccentric. This is a very important feature for the reason that owing to this condition one side of the car will be lifted when lateral motion occurs, thus automatically exerting a banking action and counteracting any tendency toward the development of car roll or side sway.

From the foregoing description and a study of the drawings it will be apparent that I have provided a very simply constructed and easily installed unitary bearing structure which performs the functions of a side bearing and a lateral motion device, it being clear that there will be no necessity whatsoever for providing any lateral motion device either of the usual type or any other applied either at or near the side frames or at any other location, the single bearing device of the invention being amply sufficient to take care of all conditions. In case of wear more shims 14 or thicker ones may be inserted beneath the bearing member or plate 13. A take-up at this location will restore all parts to their normal relative positions even after prolonged service. It is really believed that the construction, operation and advantages will be readily apparent to one skilled in the art without further explanation.

While I have shown and described the preferred embodiment of the invention, it should be understood that the disclosure is simply illustrative of the principles involved and the possibilities existing and that the right is reserved to make all such changes in the details of construction as well as the arrangement and combination of parts as will widen the field of utility and increase the adaptability of the device, provided, however, such variations constitute no departure from the spirit of the invention or the scope of the claims hereunto appended.

Having thus described the invention, I claim:

1. In combination with a body bolster having a center plate and side bearing elements thereon, a truck bolster having a center bearing with lateral clearance for said center plate and formed near each end with a pocket, a load sustaining side bearing assembly within each pocket comprising a bottom bearing member mounted for rocking movement longitudinally of the truck bolster, a roller traveling upon said bottom bearing member, and a top bearing member engaged by the roller and having a socket receiving the depending side bearing element carried by the body bolster.

2. In combination with a body bolster having a center plate and side bearing elements thereon, a truck bolster having a center bearing with clearance for said center plate and formed near each end with a pocket, a load sustaining side bearing assembly within each pocket comprising a bottom bearing member mounted for rocking movement longitudinally of the truck bolster, a roller traveling upon said bottom bearing member, a top bearing member engaged by the roller and having a socket receiving the depending side bearing element carried by the body bolster, and means at the opposite ends of the rollers operatively engaged with the upper and lower bearing members.

3. In combination with a body bolster having a center plate and side bearing elements thereon, a truck bolster having a center bearing with clearance for said center plate and formed near each end with a pocket, a load sustaining side bearing assembly within each pocket comprising a bottom bearing member mounted for rocking movement longitudinally of the truck bolster, a roller traveling upon said bottom bearing member, a top bearing member engaged by the roller and having a socket receiving the depending side bearing element carried by the body bolster, and rocking members at the opposite ends of the rollers operatively engaged with the upper and lower bearing members.

4. In combination with a body bolster having a center plate and side bearing elements thereon, a truck bolster having a center bearing with clearance for said center plate and formed near each end with a pocket, a load sustaining side bearing assembly within each pocket comprising a bottom bearing member mounted for rocking movement longitudinally of the truck bolster, a roller traveling upon said bottom bearing member, a top bearing member engaged by the roller and having a socket receiving the depending side bearing element carried by the body bolster, and rocker members at the opposite ends of the rollers operatively engaged with the upper and lower bearing members, one rocker member being fixed with respect to the roller.

5. In combination with a body bolster having depending side bearing elements, a truck bolster provided near each end with a pocket, a load sustaining side bearing assembly within each pocket comprising a bottom bearing member mounted for rocking movement on the bottom of the pocket longitudinally of the truck bolster, a top bearing member having a socket receiving the depending side bearing element on the body bolster, and a roller mounted between said top and bottom bearing members and movable with respect thereto.

6. In combination with a body bolster having depending side bearing elements, a truck bolster provided near each end with a pocket, a load sustaining side bearing assembly within each pocket comprising a bottom bearing member mounted for rocking movement on the bottom of the pocket longitudinally of the bolster, a top bearing member having a socket receiving the depending side bearing element on the body bolster, the bottom of said socket being curved to permit rocking, a roller mounted between said top and bottom bearing members and movable with respect thereto, said top and bottom bearing members having extensions at their sides, and rocker members located at the opposite ends of the roller in confined relation thereto and engaging said extensions.

7. In combination with a body bolster having depending side bearing elements, a truck bolster provided near each end with a pocket, a load sustaining side bearing assembly within each pocket comprising a bottom bearing member mounted for rocking movement on the bottom of the pocket longitudinally of the truck, a top bearing member having a socket receiving the depending side bearing element on the body bolster, a roller mounted between said top and bottom bearing members and movable with respect thereto, said top and bottom bearing members having extensions at their sides, and rocker members located at the opposite ends of the roller and confined thereto and engaging said extensions, the rocker members being notched for the reception of the extensions and one being fixed for rotation with the roller.

8. A truck bolster provided near each end with a pocket and provided at the bottom of each pocket with a socket, a bearing element within the socket, and a load sustaining side bearing assembly including a bottom bearing member having a partially cylindrical projection rockably mounted on said bearing element for rocking movement longitudinally of the bolster, a roller upon the bottom bearing member, a top bearing member seated upon the roller adapted to support the depending side bearing element of a body bolster, and guide means within the pocket at opposite sides thereof coacting with the bottom bearing member.

9. A truck bolster provided near each end with a pocket and provided at the bottom of each pocket with a socket, a bearing element within the socket, and a load sustaining side bearing assembly including a bottom bearing member having a partially cylindrical projection rockably mounted on said bearing element for lateral movement, a roller upon the bottom bearing member, a top bearing member upon the roller adapted to support the depending side bearing element of a body bolster and having a supporting surface of a partially cylindrical contour, and guide means within the pocket at opposite sides thereof coacting with the bottom bearing member, said guide means being formed as webs having arcuate confronting edges concentric with the coacting projections of said bearing element.

10. In a car truck, the combination with a body bolster having a center plate and side bearing elements thereon, of a truck bolster having a center bearing with lateral clearance for said center plate to permit lateral motion of the body bolster, the truck bolster having a pocket near each end, a load sustaining side bearing assembly within each pocket comprising top and bottom members and an interposed traveling roller, the bottom member having a lower curved bearing surface and the top member having a curved bearing surface for the depending side bearing element of the bolster, the centers of curvature of said curved surfaces being eccentric whereby to exert a lifting action on the body bolster upon the occurrence of lateral motion.

11. In combination, a body bolster having depending side bearing elements, a truck bolster provided near each end with a pocket, and a load sustaining side bearing assembly mounted within each pocket and including top and bottom members with a traveling roller interposed between them, the bottom member having a cylindrical surface bearing upon the bottom of the pocket and the top member having a cylindrical surface bearing against the depending side bearing element carried by the body bolster, the centers of curvature of said curved surfaces being on lines transverse with respect to the bolsters and out of coincidence whereby to exert a lifting action upon the body bolster upon the occurrence of lateral motion thereof.

12. A truck bolster provided near each end with a pocket, a load sustaining side bearing assembly mounted within each pocket and including a bottom bearing member mounted for rocking movement longitudinally of the bolster, a top bearing member adapted to engage the depending side bearing element of a body bolster and confined with respect thereto for movement therewith, a roller interposed between and movable with respect to said top and bottom bearing members, and means carried by the roller and operatively engaging the top and bottom bearing members beyond the areas of contact therewith with the roller.

13. A truck bolster provided near each end with a pocket, a load sustaining side bearing assembly mounted within each pocket and including a bottom bearing member mounted for rocking movement longitudinally of the bolster, a top bearing member adapted to engage the depending side bearing element of a body bolster and confined with respect thereto for movement therewith, a roller interposed between and movable with respect to said top and bottom bearing members, and means carried by the roller and operatively engaging the top and bottom bearing members beyond the areas of contact therewith with the roller and acting to effect movement thereof in opposite directions with respect to the roller upon the occurrence of relative swivelling movement of the truck and body bolsters.

14. A truck bolster provided near each end with a pocket, a load sustaining side bearing assembly mounted within each pocket for rocking movement longitudinally of the bolster, and including top and bottom bearing members having a tapered roller interposed therebetween, and means connecting said top and bottom bearing members for effecting movement thereof in opposite directions with respect to the roller and laterally of the bolster upon the occurrence of relative swivelling movement of the truck and body bolsters.

In testimony whereof I affix my signature.

THOMAS H. SYMINGTON.